(12) United States Patent
Dorfman

(10) Patent No.: US 7,313,411 B2
(45) Date of Patent: Dec. 25, 2007

(54) WIRELESS COMMUNICATION SYSTEM

(76) Inventor: Bertrand Dorfman, 444 E. 82nd St., New York, NY (US) 10028

( * ) Notice: Subject to any disclaimer, the term of this patent is extended or adjusted under 35 U.S.C. 154(b) by 498 days.

(21) Appl. No.: 11/101,237

(22) Filed: Apr. 7, 2005

(65) Prior Publication Data

US 2005/0227647 A1 Oct. 13, 2005

Related U.S. Application Data

(60) Provisional application No. 60/559,774, filed on Apr. 7, 2004.

(51) Int. Cl.
*H04B 1/26* (2006.01)

(52) U.S. Cl. .................. 455/552.1; 455/553.1

(58) Field of Classification Search .............. None
See application file for complete search history.

(56) References Cited

U.S. PATENT DOCUMENTS

| 5,541,976 | A | * | 7/1996 | Ghisler | 455/426.1 |
| 5,564,077 | A | * | 10/1996 | Obayashi et al. | 455/553.1 |
| 6,014,561 | A | * | 1/2000 | Molne | 455/553.1 |

\* cited by examiner

*Primary Examiner*—Thanh Cong Le
(74) *Attorney, Agent, or Firm*—Reed Smith LLP

(57) ABSTRACT

There is disclosed a multi-unit communication system having, at each unit, both an FM receiver and a FM transmitter as well as a digital receiver and transmitter. The primary communication of an information signal from the system to a plurality of mobile hand held transceivers is through the FM transmitters. The digital receiver and transmitter provides a back channel to provide communication of the message throughout the set of units to assure that the information is available at each unit for conversion from digital to analog form so as to be broadcast by the FM transmitter.

24 Claims, 5 Drawing Sheets

WIRELESS COMMUNICATION SYSTEM

REFERENCE TO RELATED APPLICATIONS

This application claims the priority of the Provisional Application No. 60/559,774 filed Apr. 7, 2004 filed by Bertrand Dorfman and titled: Wireless Network Repeater, the entire disclosure of which is hereby incorporated by reference.

BACKGROUND OF THE INVENTION

This invention relates to a technique of implementing wireless communication with multiple locations in a building or complex structure.

A typical situation to which this invention is addressed is one in which communication is desired inside and outside a building between various devices such as would be found in a telecommunications, local area network, security or life safety system. In order to provide effective communication, a network must be created which enables the various devices which must communicate with each other to be interconnected. This interconnected network is typically comprised of copper wire, fiber optic cables or the equivalent. As a result all equipment is in a fixed position, unable to be moved and encumbered by means of cables which are costly and time consuming to install and maintain and difficult to modify. In addition, if an emergency arises and certain segments of the cabling network are damaged or destroyed, the entire system may become inoperable. This is particularly troublesome when considering life safety or security.

An alternate to the creation of cabling networks is wireless communication. A walkie-talkie system is one example. However, to date this technique has yielded limited results in that effective communication can only be accomplished over short distances.

OBJECTS OF THE INVENTION

Accordingly, it is a major purpose of this invention to provide a system with a much improved tradeoff of lower cost and greater reliability, that will facilitate communication throughout a building, or other complex structure, between a set of mobile normally hand held push to talk type devices often called walkie-talkies.

This invention is directed to a system which permits this type of communication with presently available and commonly used mobile two-way communication devices.

It is a related purpose of this invention to provide the low cost and enhanced reliability result in a product that is easy to maintain.

A specific purpose of this invention is to provide effective communication with a large number of hand held walkie-talkies that may be moving throughout a building and to avoid multi-path fading at the walkie-talkies that occurs if the signal to the walkie-talkies is strong-enough to produce significant reflection off of walls and other structures.

BRIEF DESCRIPTION

There are two embodiments of the invention disclosed.

Each embodiment involves multiple units in which each unit has an FM receiver and an FM transmitter as well as a digital modulation (DM) receiver and a digital modulation (DM) transmitter. The system is geared to facilitate wireless communication between a set of walkie-talkies within range of one or more units of the system.

The system of this invention works to provide improved communication between a group of walkie-talkies in a building or other complex structure. But the system of this invention does not by itself constitute any of the walkie-talkies.

Typically, what happens is that an operator of one of the walkie-talkies actuates the press to talk button and sends a frequency modulated (FM) message out to all walkie-talkies within range. To enhance that range, particularly in complicated structures such as high rise buildings, the system operates as follows.

The FM receiver in the unit closest to the transmitting walkie-talkie picks up the message, and the unit demodulates the message, converts the message through an analog to digital converter to a digital message which is then modulated on the DM transmitter and broadcast to DM receivers in one or more other units. Each DM receiver then demodulates the message and through a digital to analog converter provides the message to the associated FM transmitter in the unit, which FM transmitter broadcasts the message. That message is then received by all of the walkie-talkies in range and may also be received by other units. However, the digital encoded message broadcast by the DM transmitter is the event that assures the underlying message is received at all units in the system.

On receipt of the DM message by these other units, the digital message is converted to an analog form necessary for wireless transmission from the associated FM transmitter in the unit. It is further broadcast as a digitally encoded message by the DM transmitter.

In this fashion, the DM transmitter can be used to assure that the message is received at a multiple number of units so that if a unit is non-functioning, its non-functionality will not block the transmission of a message throughout the system.

The employing of the digital channel makes it possible to maintain the power of each FM transmitter at a low enough level to minimize the effect on a walkie-talkie receiver of receiving multiple out of phase signals of the,same message. Multi-path reception results in fading; that is, the lessening of the signal to noise ratio and also results in fuzziness and distortion of the audio signal.

Thus, it is normally not desirable to have an individual FM transmitter with sufficient power to reach any large number of the units in the system. But it is acceptable for the digital transmitter to have enough power to reach out to a much larger number of units and, depending on the circumstance, possibly to all of the units.

However, there is preferably a range of transmission between the FM transmitter and some adjacent units.

This serves to provide enhanced reliability for the system to assure that the message reaches all of the walkie-talkies within the range of the system.

BRIEF DESCRIPTION OF THE DRAWINGS

FIG. 2 shows a single unit in which the four major components are in two spaced apart sub-units; the four major components being the FM receiver 18, DM transmitter 20, FM transmitter 22 and DM receiver 24.

DESCRIPTION OF THE PREFERRED EMBODIMENTS

Figure 1:
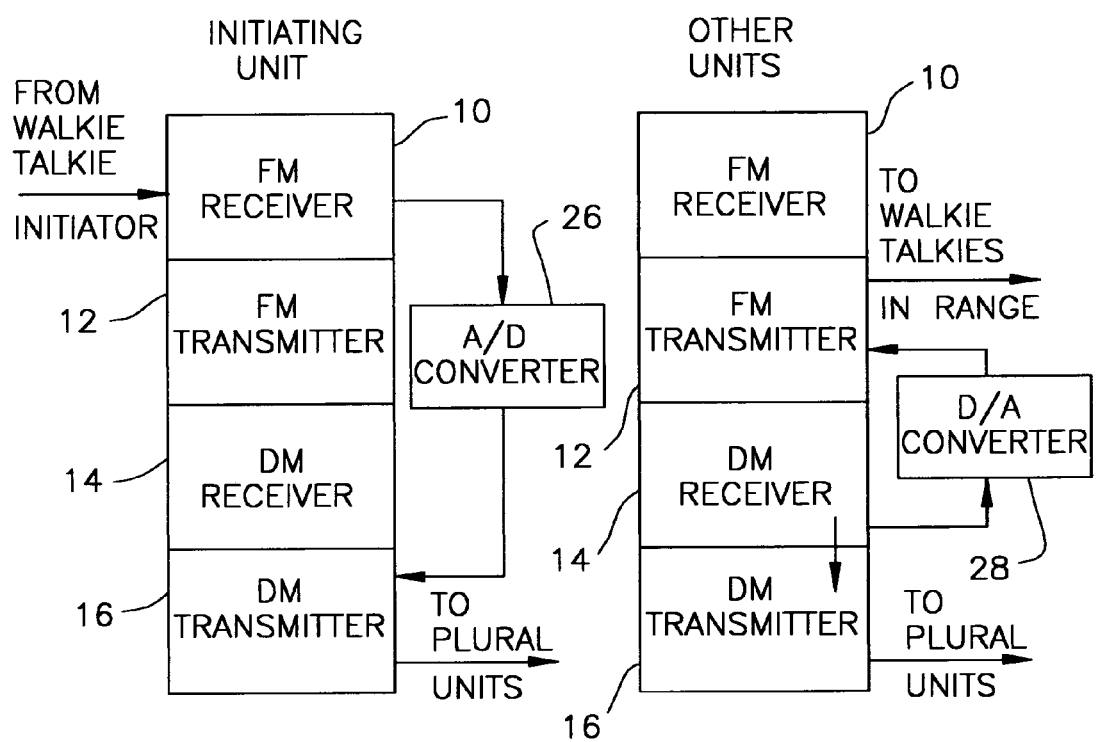
FIG. 1 is a simplified block diagram of a first embodiment of this invention illustrating two of the units that make up this system and showing that each unit has an FM receiver 10, FM transmitter 12, digitally modulated (DM) receiver 14 and digitally modulated transmitter 16. This block diagram essentially shows the manner in which a message is processed through the various major components of the system.

FIG. 1 illustrates two of the individual units that have a plurality of units that encompass a preferred embodiment of this invention. In each unit, there is an FM transceiver composed of a receiver 10 and a transmitter 12 as well as a digital modulation (DM) transceiver 14 and a transmitter 16.

This is a system intended to facilitate communication between a set of hand held, push to talk, walkie-talkie transceivers of a standard type. These walkie-talkies are not shown since they are not part of the system as such. But they are the source of the message that is processed by the system and the recipients of the message that is broadcast by the system.

In FIG. 1, one of the units is designated the initiating unit because that is the unit that happens to receive the FM message broadcast from one of the hand held devices. That message is received at the FM receiver 10, demodulated therein and converted by an analog to digital converter 26 to a signal appropriate to being modulated on the carrier of the DM transmitter 16.

As is standard in FM transceivers, receipt by the FM receiver component 10 disables the FM transmission function of the transmitter 12. Similarly, transmission by the DM transmitter 16 disables the DM receiving function of DM transceiver 14, 16. The DM message is broadcast by the transmitter 16 to one or more other units where, as shown, it is received by the DM receiver 14. The DM receiver 14 demodulates the message and a digital to analog converter 28 supplies a message to the FM transmitter 12. The FM transmitter 12 then broadcasts the messages of the FM signal to the walkie-talkie units in the range of the transmitter 12. Because the FM transmitter 12 is transmitting, the FM receiver 10 is disabled.

In addition, the DM message received at the DM receiver 14 is applied to the DM transmitter 16 for broadcast to additional units. At those additional units, the processing described with respect to the "other" unit components 10, 12, 14 and 16 is repeated.

The broadcast from the DM transmitter 16 is received at a plurality of other units and may even in some cases be received at all of the other units. By known techniques, the DM transmission may be coded so that the transmission from any one of said DM transmitters is received at only a predetermined one of said DM receivers. This requires the encoding of the DM transmitters and receivers.

The FM transmission from the transmitter 12 is sufficiently great to be received by a number of the walkie-talkies in its area. But it is kept at a level low enough to minimize the effect of multi-path fading.

However, depending upon the configuration of the building in which the system operates, the FM transmission of any given unit may well be received by FM receivers 10 at one or more other units. In many cases, that is preferable to assure the transmission of the message throughout the system.

In general, the system is designed to provide a substantial large signal broadcast from a DM transmitter 16 to assure that the message is received either directly or indirectly by all of the DM receivers 14 in all of the units. The transmission from the FM transmitter 12 is designed to be effective to cover a zone in which the unit is intended to communicate with walkie-talkie transceivers. There will have to be some FM transmission overlap in the area covered by nearby units in order to assure complete coverage of the zone within which the system is deployed.

In general, the FM channel and DM channel interrelate to permit a level of power transmission from each FM transmitter that is low enough to avoid FM fading and loss of clarity at the walkie-talkies yet assure transmission throughout the system.

The units are preferably battery operated so as to be operable independent of the building's electrical system and to optimize positioning of the units without requiring the expense of wiring installation.

The digital modulation may be any one of various types. Applicant presently considers phase shift keying (PSK) to be a useful mode.

Figure 2:
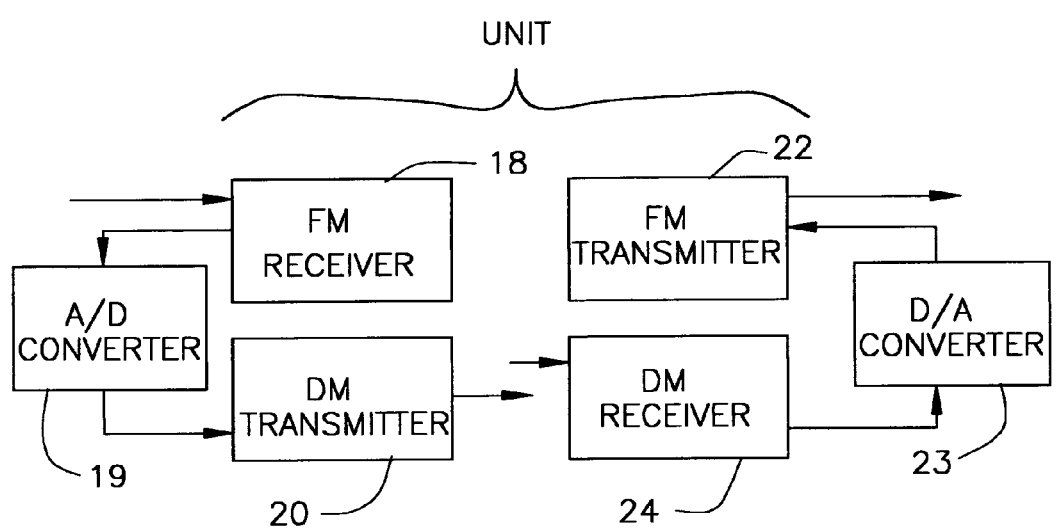
FIG. 2 is a simplified block diagram of a second embodiment of this invention illustrating the manner in which the message is moved through the various components of this invention.

FIG. 2 illustrates a second embodiment. The FIG. 2 system is a plurality of the units shown in FIG. 2.

Unlike FIG. 1, each unit in the FIG. 2 system is composed of a set of separated components. In FIG. 2, there is a first sub-unit composed of an FM receiver 18 and a DM transmitter 20 and a second sub-unit composed of an FM transmitter 22 and a DM receiver 24. These sub-units might be placed approximately one-hundred feet apart.

In operation, an FM signal received at the receiver 18 from a walkie-talkie or from another unit is demodulated and converted by the A to D converter 19 so that it can be broadcast by digital transmitter 20. The signal from the digital transmitter 20 is picked up by the digital receiver 24 within the unit and converted by a D to A converter 23 so that it can be transmitted by the FM transmitter 22. The FM transmitter 22 will broadcast to those hand held walkie-talkies within the range of the transmitter 22 and preferably to other nearby units.

The spacing between the FM transmitter 22 and the FM receiver 18 is such as to assure that the signal received at the receiver 18 from the transmitter 22 is small enough so that it can be discriminated against by the receiver 18 and avoid interfering with the proper receipt of the primary signal received by the receiver 18. This discrimination is achieved by known techniques that take into account amplitude diminution and phase shifting.

Figure 3:
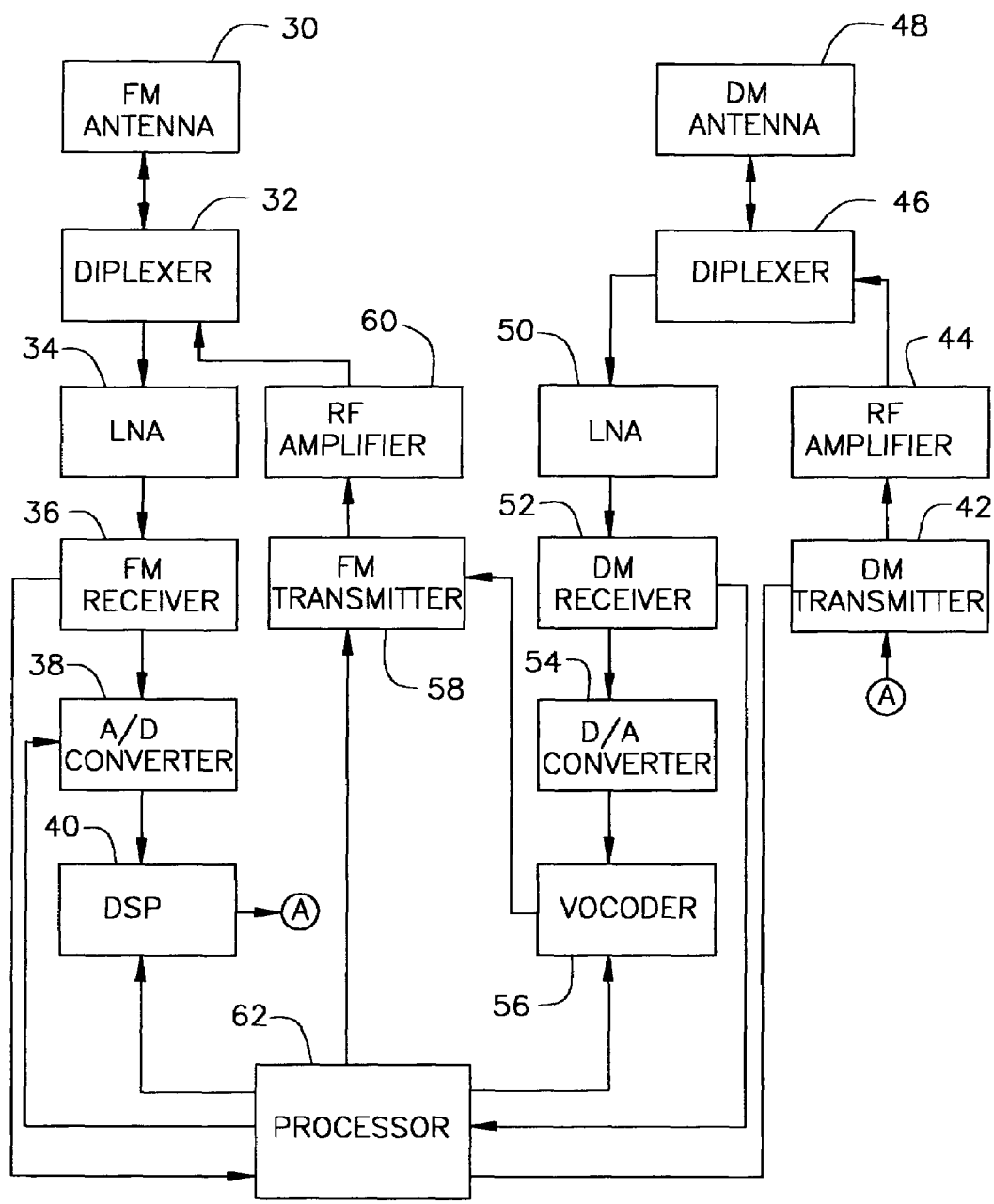
FIG. 3 is a more detailed block diagram of a single unit of the FIG. 1 embodiment.

FIG. 3 shows a more detailed block diagram of the individual units shown in FIG. 1. As shown in FIG. 3, an FM antenna 30 is associated with an appropriate diplexer 32 so that it can both receive and transmit. When it receives an FM signal from a source exterior to the system such as from a hand held walkie-talkie, that signal is processed through a low noise amplifier 34 to the FM receiver 36 which demodulates the FM signal and provides an analog audio signal to the analog to digital converter 38. The digital signal processor (DSP) 40 provides an appropriate time compression to the digital converter 38 output for application to the DM transmitter 42. The output from the DM transmitter 42 is amplified by the RF amplifier component 44 to provide an appropriate signal, through the diplexer 46, to be transmitted by the DM antenna 48.

In one of these units, such as one of the so-called other units referred to in FIG. 1, the DM signal is received at the antenna 48 and, through the diplexer 46, applied to the low noise amplifier 50 to provide an appropriate signal for the DM receiver 52. The DM receiver 52 demodulates the signal received from the low noise amplifier 50 and passes the digital signal on to the digital to analog converter 54 where the digital values from the receiver are converted into an amplitude modulated pulse message signal. The Vocoder 56 processes the sequence of amplitude modulated pulses to reconstruct the original audio analog input signal. This audio signal is applied to the FM transmitter 58 to provide the FM signal that is amplified by the FM amplifier 60 and thus provides the signal appropriate for broadcast. The signal is passed on by the diplexer 32 for broadcast from the FM antenna 30.

The processor 62 is essentially a timing device that receives a signal from the FM receiver 36 or DM receiver 52 to manage either the timing of the transfer of digital data from the digital signal processor 44 to the transmitter 27 or from the Vocoder 56 through the FM transmitter 58.

Figure 4A:
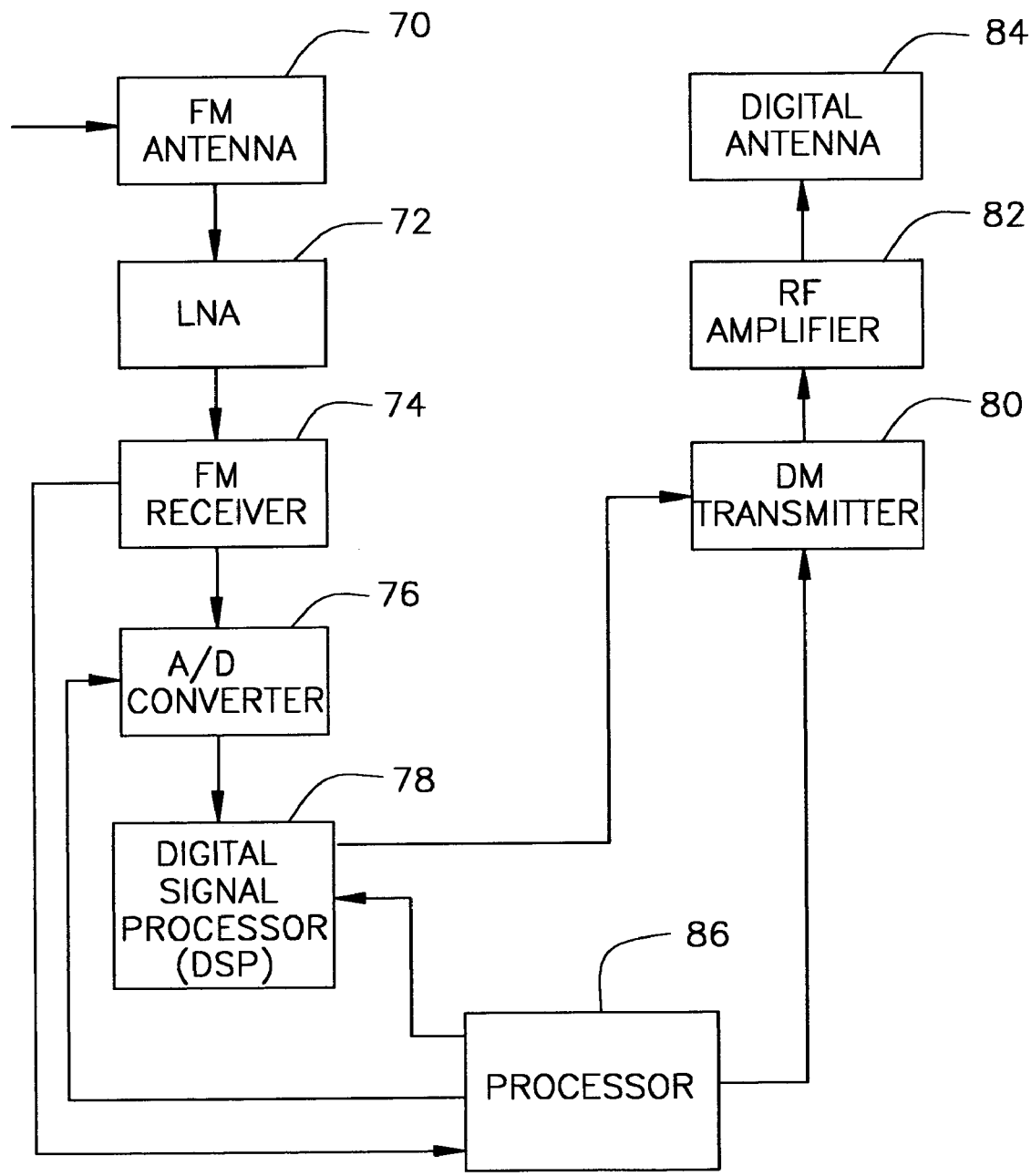
FIGS. 4A and 4B are more detailed block diagrams of a unit of the FIG. 2 embodiment of this invention.
Figure 4B:
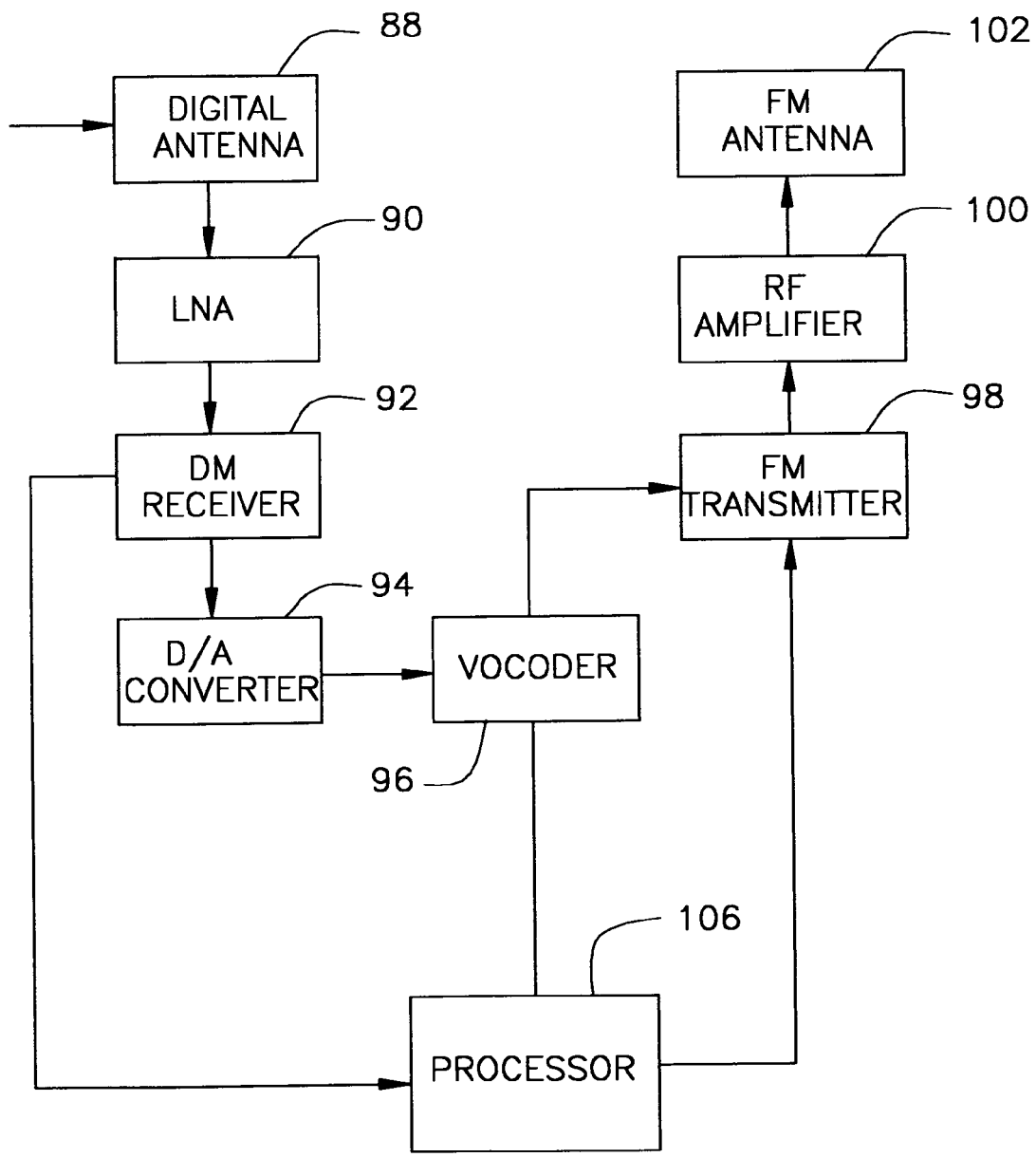

FIGS. 4A and 4B show a more detailed block diagram of the individual units shown in FIG. 2. FIG. 4A represents the FM receiver 18 and DM transmitter 20 of FIG. 2. FIG. 4B represents the FM transmitter 22 and DM receiver 24 of FIG. 2.

As shown in FIG. 4A, the FM antenna 70 takes an input signal either from an initiating walkie-talkie or from another unit. Through the low noise amplifier 72, a signal is provided to the FM receiver 74. The receiver 74 provides an analog audio signal to the analog to digital converter 76; which converter provides digital values to the digital system processor (DSP) 78. The DSP provides a time compressed output digital signal. This output of the DSP 78 is applied to the digital transmitter 80. The transmitter 80 provides a digital modulated signal that is amplified by the RF amplifier 82 to provide a signal having an amplitude appropriate for broadcast by the digital antenna 84.

The processor 86 performs a similar function to the processor 52 in FIG. 3. It is a timing device that receives a signal from the receiver 74 to manage the timing of the transfer of digital data from the DSP 78 to the DM transmitter 80.

FIG. 4B illustrates the situation where digitally modulated signals are received at the digital antenna 88. The signals, amplified by the low noise amplifier 90, provide an appropriate input to the DM receiver 92. The DM receiver 92 provides a digitally encoded message which is converted by the digital to analog converter 94 into appropriate amplitude modulated pulses. The Vocoder 96 processes the sequence of amplitude modulated pulses to reconstruct the original audio analog signal which is then an input to the FM transmitter 98 which provides the FM radio frequency signal. This FM radio frequency signal is amplified by the RF amplifier 100 to a level appropriate for transmission by the FM antenna 102.

It is the output of the FM antenna 102 that is picked up by one or more walkie-talkies in an appropriate zone covered by the antenna 102. As mentioned above, the zone is preferably great enough to overlap with another unit. But, to avoid multi-path fading at the walkie-talkies, the signal is not strong enough to extend throughout the system.

The processor 106 provides the required timing function to control when a received signal is processed by the Vocoder 96 for application to the FM transmitter 98.

While the foregoing description and drawings represent the presently preferred embodiments of the invention, it should be understood that those skilled in the art will be able to make changes and modifications to those embodiments without departing from the teachings of the invention and the scope of the claims.

In an application of the system to a particular building, it may often be desirable to include a base station unit for the purpose of monitoring and reporting the operational status of each of the units in the system. Such a monitoring arrangement is known in the art. It essentially involves a wireless transceiver tuned to the system's second modulation mode or digital channel frequency. Appropriately coded messages are submitted periodically which contain instructions for each individual unit to generate a self-test and report the outcome to the base station. This can involve a routine as minimal as checking out the status of the batteries of each unit to checking out the functionality of the individual components at each unit. The base station would operate in a second modulation mode which is the digital mode in the embodiment described herein.

Applicant considers that the base station unit would preferably be powered by line voltage with battery back-up and would have electronic display information. This information would provide outputs to indicate whatever defects may be found and also could be used to operate a printer for reporting the results.

What is claimed is:

1. A wireless communication system comprising:
   a plurality of communication units, each of said units having:
   (a) a first receiver and a first transmitter, both operating in a first modulation mode, and
   (b) a second receiver and a second transmitter, both operating in a second modulation mode,
   said first receivers and said first transmitters of said units providing a first signal processing function for said system to receive a wireless message from outside said system on at least one of said first receivers and to transmit a wireless message from each of said first transmitters to receivers outside of said system,
   said second receivers and second transmitters of said units creating a second signal processing function for said system to transmit said message as a wireless message through other ones of said units and thus provide a link between a message received at one of said first receivers from outside said system to each of said units for wireless transmission from each of said first transmitters,
   a first mode to second mode message signal converter at each of said units to couple whatever message is received in said first modulation mode at said first receiver to said second modulation mode for broadcast by the second transmitter of the associated unit,
   a second mode to first mode message signal converter at each of said units to couple whatever message is received in said second mode at said second receiver to said first modulation mode at said first transmitter of the associated unit.

2. The system of claim 1 wherein: the range of transmission from said first transmitter is great enough to encompass a plurality of said first receivers in other units and wherein: said range is substantially less than the entire system.

3. The system of claim 1 wherein: the transmission range of the second transmitter in each of said units extends to the second receiver in one or more of said units.

4. The system of claim 2 wherein: the transmission range of the second transmitter in each of said units extends to the second receiver in one or more of said units.

5. A wireless communication system comprising:
   a plurality of communication units, each of said units having:
   (a) a first receiver and a first transmitter, both operating in a first modulation mode, and
   (b) a second receiver and a second transmitter, both operating in a second modulation mode,
   receipt of a message in said first modulation mode by said first receiver of any one of said units, enabling wireless transmission of said message by the associated one of said second transmitters in said second modulation mode to one or more of said second receivers in one or more other ones of said units,
   receipt of a message in said second modulation mode by a second receiver of any of said units, enabling wireless transmission in said first modulation mode of said message by the associated one of said first transmitters, and enabling wireless transmission of said message in said second modulation mode by the associated one of said second transmitters.

6. The system of claim 5 wherein: said first modulation mode is frequency modulation and said second modulation mode is a digital modulation.

7. The system of claim 5 wherein: the range of transmission from said first transmitter is great enough to encompass a plurality of said first receivers in other units and wherein: said range is substantially less than the entire system.

8. The system of claim 5 wherein: the transmission range of the second transmitter in each of said units extends to the second receiver in more than one of said units.

9. The system of claim 7 wherein: the transmission range of the second transmitter in each of said units extends to the second receiver in more than one of said units.

10. A wireless communication system comprising:
a plurality of communication units, each of said units having:
  (a) a first receiver and a first transmitter, both operating in a first modulation mode, and
  (b) a second receiver and a second transmitter, both operating in a second modulation mode,
communication of a message between said units being wireless communication in said second modulation mode from a second transmitter in one of said units to a second receiver in one or more of the others of said units,
communication of a message to receivers outside of said units being wireless transmission from said first transmitter in said first modulation mode converted from a message in said second modulation mode received by the associated second receiver,
communication of a message in said first modulation mode from a transmitter outside of said units being converted to a message in said second modulation mode for wireless transmission by the associated one of said second transmitters.

11. The system of claim 10 wherein: said first modulation mode is frequency modulation and said second modulation mode is a digital modulation.

12. The system of claim 10 wherein: the range of transmission from said first transmitter is great enough to encompass a plurality of said first receivers in other units and wherein: said range is substantially less than the entire system.

13. The system of claim 10 wherein: the transmission range of the second transmitter in each of said units extends to the second receiver in more than one of said units.

14. The system of claim 12 wherein: the transmission range of the second transmitter in each of said units extends to the second receiver in more than one of said units.

15. A wireless communication system comprising:
a plurality of communication units, each of said units having:
  (a) a first receiver and a first transmitter, both operating in a first modulation mode, and
  (b) a second receiver and a second transmitter, both operating in a second modulation mode,
each of said units having spaced apart first and second subunits,
said first subunit comprising said first receiver and said second transmitter,
said second subunit comprising said first transmitter and said second receiver,
within each of said units:
  (a) said first receiver demodulating a received signal in said first modulation mode to provide a signal input to said second transmitter,
  (b) said second transmitter responsive to said signal input from said first receiver to provide wireless transmission of said signal in said second modulation mode,
  (c) said second receiver demodulating a received signal in said second modulation mode to provide a signal input to said first transmitter,
  (d) said first transmitter responsive to said signal input from said second receiver to provide wireless transmission of said signal in said first modulation mode.

16. The system of claim 15 wherein: said first modulation mode is frequency modulation and said second modulation mode is a digital modulation.

17. The system of claim 15 wherein: the transmission range of the first transmitter in each of said units extends to the first receiver in each of a plurality of other units and wherein said range is substantially less than the entire system.

18. The system of claim 15 wherein: the transmission range of the second transmitter in each of said units extends to the second receiver in more than one of said units.

19. The system of claim 17 wherein: the transmission range of the second transmitter in each of said units extends to the second receiver in more than one of said units.

20. A wireless communication system comprising:
a plurality of communication units, each of said units having:
  a first receiver and a first transmitter, both operating in a first modulation mode, and
  a second receiver and a second transmitter, both operating in a second modulation mode,
each of said units having spaced apart first and second subunits,
said first subunit comprising said first receiver and said second transmitter,
said second subunit comprising said first transmitter and said second receiver,
within each of said units, a message received in a first modulation mode at said first receiver being converted for wireless transmission by the associated second transmitter as a message in said second modulation mode to the associated second receiver,
within each of said units, a message received in said second modulation mode by said second receiver being converted for wireless transmission by the associated first transmitter as a message in said first modulation mode.

21. The system of claim 20 wherein: said first modulation mode is frequency modulation and said second modulation mode is a digital modulation.

22. The system of claim 20 wherein: the transmission range of the first transmitter in each of said units extends to the first receiver in each of a plurality of other units and wherein said range is substantially less than the entire system.

23. The system of claim 20 wherein: the transmission range of the second transmitter in each of said units extends to the second receiver in one or more of said units.

24. The system of claim 22 wherein: the transmission range of the second transmitter in each of said units extends to the second receiver in one or more of said units.

* * * * *